United States Patent [19]

Staples

[11] Patent Number: 5,483,576
[45] Date of Patent: Jan. 9, 1996

[54] METHOD AND APPARATUS FOR COMMUNICATING DATA OVER A RADIO TRANSCEIVER WITH A MODEM

[75] Inventor: Leven E. Staples, San Antonio, Tex.

[73] Assignee: Data Race, Inc., San Antonio, Tex.

[21] Appl. No.: 457,742

[22] Filed: Jun. 1, 1995

Related U.S. Application Data

[63] Continuation of Ser. No. 41,406, Mar. 31, 1993, abandoned.

[51] Int. Cl.$^6$ ................................................. H04M 11/00
[52] U.S. Cl. ............................. 379/58; 379/97; 375/222
[58] Field of Search ................................. 379/58, 59, 63, 379/98, 93, 97; 375/216, 222, 223

[56] References Cited

U.S. PATENT DOCUMENTS

| | | | |
|---|---|---|---|
| 4,658,096 | 4/1987 | West, Jr. et al. | 379/59 |
| 4,737,975 | 4/1988 | Shafer | 379/58 |
| 4,775,997 | 10/1988 | West, Jr. et al. | 379/58 |
| 4,837,800 | 6/1989 | Freeburg et al. | 379/60 |
| 4,852,146 | 7/1989 | Hathcock et al. | 379/58 |
| 4,991,197 | 2/1991 | Morris | 379/58 |
| 5,127,041 | 6/1992 | O'Sullivan | 379/59 |

FOREIGN PATENT DOCUMENTS 8700718  1/1987  WIPO ..................................... 379/63

OTHER PUBLICATIONS

"AB3X Cellular Interface Owner's Manual" by Morrison & Dempsey Communications, 1987.
Fike et al, *Understanding Telephone Electronics*, Chapter 2 pp. 56–60, 1984.

Primary Examiner—Dwayne D. Bost
Assistant Examiner—Michael B. Chernoff
Attorney, Agent, or Firm—Vinson & Elkins

[57] ABSTRACT

A modem normally adapted for use on the PSTN communicates with a radio transceiver, typically a cellular telephone via an interface. The interface is coupled to the modem to communicate audible frequency computer data, control signals and status signals. The interface converts the audio-frequency control signals from the modem into binary signals for the radio transceiver and converts status signals from the radio transceiver to audible-frequency control signals detectable by the modem.

34 Claims, 3 Drawing Sheets

METHOD AND APPARATUS FOR COMMUNICATING DATA OVER A RADIO TRANSCEIVER WITH A MODEM

RELATED APPLICATIONS

This application is a Continuation of application Ser. No. 08/041,406, filed Mar. 31, 1993, and entitled "Method and Apparatus for Communicating Data Over a Radio Transceiver With a Modum", now abandoned.

TECHNICAL FIELD OF THE INVENTION

The present invention relates in general to modem communications and more particularly to interfacing a computer with a cellular or other radio telephone transceiver to communicate data.

BACKGROUND OF THE INVENTION

Communication of data over the Public Switched Telephone Network (PSTN) is becoming an increasingly important aspect of computing. In particular, communication between portable computers and office computers or networks has increased substantially along with advances in portable computers. Such communications allow a user remote access to data stored on a host computer system. Advances in cellular communications have increased the ability of people to transact business in locations away from a hardwire connection to the telephone company's central office. Consequently, the need to exchange data through a cellular or other radio telephone transceiver has increased.

In one form of the prior art, a standard touch-tone or rotary dial telephone set was interfaced to a radio transceiver by means of an interface which provides a simulation of a telephone central-office. Such systems, which will be referred to as Telco emulators, are disclosed in U.S. Pat No. 4,737,975 to Shafer and U.S. Pat. Nos. 4,658,096 and 4,775,997 to West and Shafer. These patents disclose essential features required of an interfacing means between an ordinary touch-tone or rotary dial telephone set and a cellular telephone or other radiotelephone transceiver in order to provide for the communication of voice between the telephone set and the radiotelephone transceiver and to provide for establishing a call through the radiotelephone transceiver by the telephone set. Telco emulators have been used to connect computers to radio transceivers via modems. For example, U.S. Pat. No. 4,837,800 to Freeburg, et al. shows a Telco emulator, the Motorola "CELLULAR CONNECTION" used to connect a modem to a cellular radio transceiver. While such an interface may be used to interface a computer to the radio transceiver via a conventional telephone-line modem, the features described are more complex than required by a modern microprocessor-based modem. The extra complexity adds to the size and weight of such interfacing means, making it less desirable in a portable environment.

While this prior art provides a simple single-pair interface between the telephone set and the interface device, the requirement of the standard telephone set for DC current, dial tone, audible tone ring-signal, and conversion of touch-tone or rotary dialing information as well as the requirement for the interface means to automatically determine the last digit dialed in order to signal the radiotelephone device to initiate the connection adds complexity, weight, and cost to the interface. This is a major disadvantage for portable computers for a number of reasons. First, computer manufacturers are reluctant to install special, extra-cost, modems in portable computers, knowing that only a small percentage of the users of the portable computers will desire to communicate over cellular or other radiotelephone facilities. Second, minimizing size and weight is very important to portable computer users.

In other prior art disclosed in U.S. Pat. No. 5,127,041 to O'Sullivan, means for interfacing a modem device to a cellular radio transceiver is shown which requires the use of separate digital-control and analog busses connecting the modem to the interface device. This approach, while demonstrably workable and providing connection between the modem device and the cellular telephone using the modem's PSTN connector, requires additional wires in the connection. This poses regulatory and safety issues (see Part 47 CFR Subpart 68) and increases the complexity of the connection between the modem and the interface device. This approach also requires special circuits in the modem to provide the digital control signals, increasing the size, complexity, and cost of the modem.

U.S. Pat. No. 5,127,041 also calls for a "Generic Control Signals" from the modem device to be translated by the interface device to the particular digital signaling sequences required for control of a particular radiotelephone transceiver. While this feature provides for connection of multiple different radiotelephone transceivers to a single modem via different interface devices for each type of radiotelephone transceiver, it is not required by a modem microprocessor based modem which can generate different control signals and sequences as required under the control of programs executed by the modem and stored in the modem or the computer to which the modem is attached. Eliminating the requirement for "Generic Control Signal" translation from the interface provides a wider range of possible attachments and a lower-cost interface device.

Radiotelephone interfacing systems not related to modems also exist in prior art. U.S. Pat. No. 4,852,146 to Hathcock et al. discloses an auxiliary dialing system between a handset and a cellular radio transceiver, but this system also uses more than a single pair of wires and requires multiple signaling circuits.

Therefore a need has arisen for a simplified interface for establishing communication between a modem and a radiotelephone transceiver which does not add significant cost or weight to the modem.

SUMMARY OF THE INVENTION

A modem communicates with a radio transceiver, typically a cellular telephone via an interface. The interface is coupled to the modem to communicate audible frequency computer data, control signals and status signals. The interface converts the audio-frequency control signals from the modem into binary signals for the radio transceiver and converts status signals from the radio transceiver to audible-frequency control signals detectable by the modem.

The present invention provides significant advantages over the prior art. First, the invention may be used with any microprocessor-based modem by providing a program to control the operation of the modem when it is connected to a radio transceiver, either as firmware or by downloading the program from the computer to the modem. Second, all signaling may be accomplished over a single pair of connections normally used by the modem to connect to the Public Switched Telephone Network (or using a 3- or 4-wire connection where separate receive and transmit signals are provided), thereby reducing the circuitry requirements of the interface. Third, since no additional circuitry is required in the modem, no additional size, weight, or cost is incurred by addition of the capability to control and communicate via the cellular telephone transceiver. This is particularly important in the portable computing market. Fourth, the interface device in the present invention is also optimized by the use of the described signaling method. The modem does not require Direct Current, Dial Tone, or High-Voltage Ringing lines. Since the interface device does not have to provide these signals to the modem, it can be much smaller and lower cost than Telco Simulators.

The tone signaling sequences that the modem provides and interprets to control the cellular telephone transceiver are sequences compatible with the particular transceiver attached. This is accomplished by the modem executing radio transceiver-specific programs which are either permanently stored in the modem or loaded from the computer to which it is attached. Since the interface device only has to integrate the tone sequences from the modem and convert them to a DC level compatible with the transceiver and to produce tones by keying an oscillation circuit with the status signal from the transceiver, the complexity of the interface device is greatly reduced.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENTS

Figure 1:
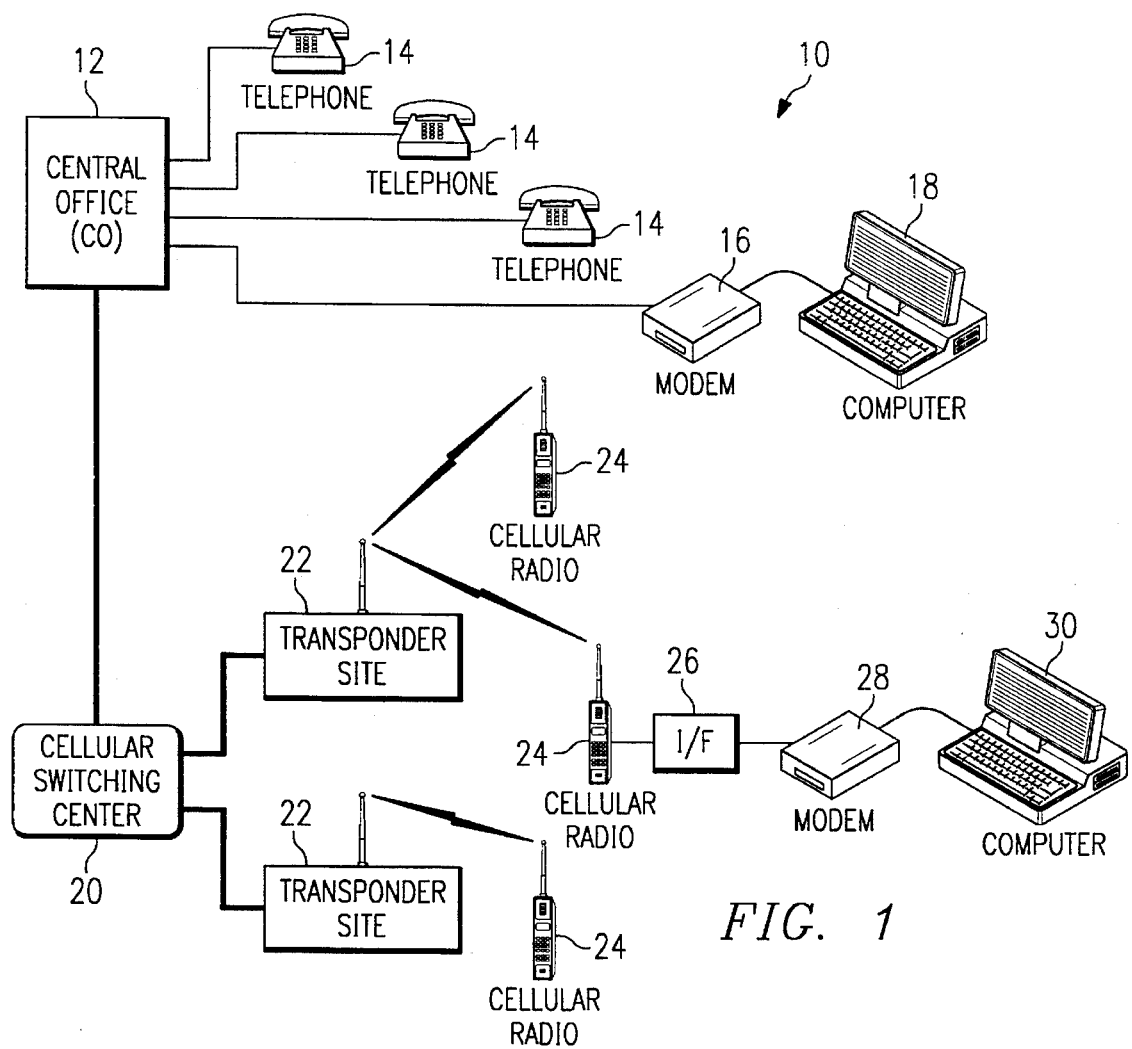
FIG. 1 is an overall block diagram of a typical cellular radio telephone network incorporating the system of the present invention.

A typical cellular radio telephone network 10 is shown in FIG. 1. A telephone company central office 12, is coupled with various telephones 14, in the local area, including modem 16 which is connected to computer 18. The telephone company central office 12 interfaces with a cellular switching center 20 which interfaces telephone company central office 12 with various cellular transponder sites 22. The cellular transponders 22 interface via radio waves to portable cellular transceivers 24.

As shown in FIG. 1, one such cellular transceiver 24 is connected by interface device 26 to a modem 28 which is installed in a portable computer 30.

In an example of a data communications session, computer 30 initiates a data link with computer 18 by executing a communications program causing modem 28 to send a dialing sequence specifying the telephone number of modem 16 to interface device 26. Interface device 26 converts the dialing sequence to a digital sequence and provides the digital sequence to transceiver 24, causing transceiver 24 to communicate the telephone number via radio waves to transponder site 22, just as if the number pad digits on the transceiver had been pressed in the proper order followed by the SEND key. Transponder site 22 relays the dialing request to cellular switching center 20 which, in turn, relays to the telephone company central office 12. The telephone company central office then establishes a connection to modem 16, causing ringing to be present at the modem. The modem 16 answers the call and sends Answer Tone which, relayed back through the entire network, is detected by modem 28. The data link is then established and data communications follow. The state of system while data communications are occurring is known as the ACTIVE state.

When computer 30 wishes to terminate the connection, it causes modem 28 to signal interface device 26 and send an END sequence in the form of tones to interface device 26. Interface device 26 converts the tones to a digital sequence which is applied to the cellular transceiver 24. This causes cellular transceiver 24 to terminate the connection, just as if the END key on the transceiver had been pressed.

While the interface device 26 is shown as a separate device in FIG. 1, it could be integrated into another component such as the cellular transceiver, either as an add-on module or as a portion of the transceiver electronics.

Figure 2:
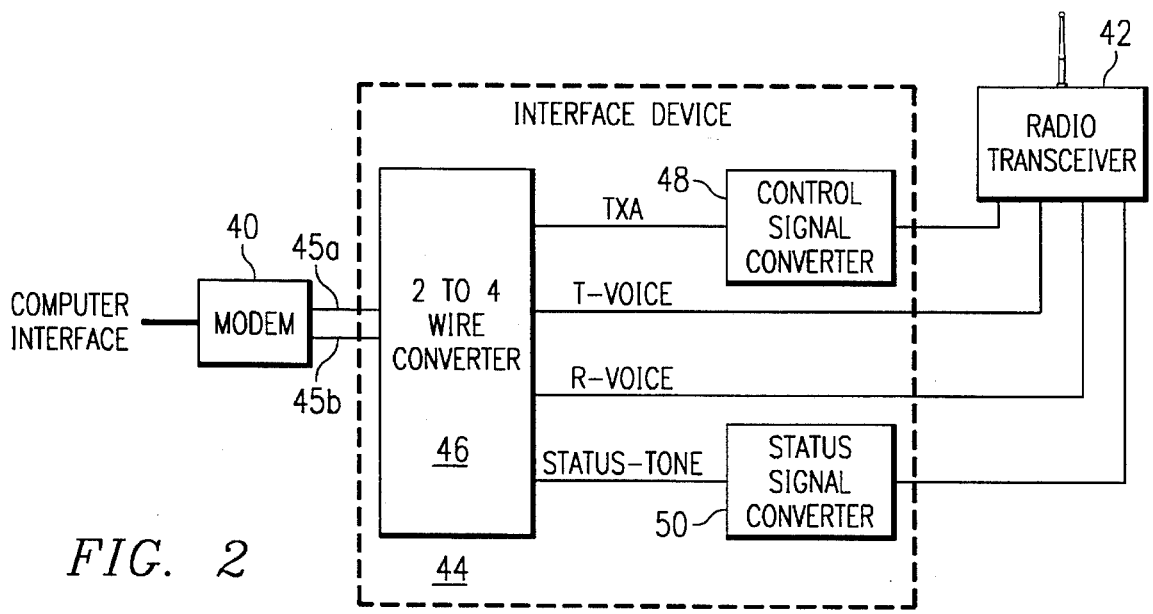
FIG. 2 is an overall block diagram of the interfacing system of the present invention.

FIG. 2 shows the general layout of the interface device which connects a modem 40 with a radio transceiver 42. In the illustrated embodiment the transceiver 42 is a hand-held cellular telephone transceiver such as the OKI PHONE 900 available from Oki Telecom (U.S.) of Suwanee, Ga. The use of such cellular telephone transceiver renders the system operable over the existing cellular network as described earlier. It should be noted that other types of radio transceivers could be used and, depending upon the particular transceiver characteristics, modifications may be required to both the hardware of the interface and the program used by the modem to control the interface in order to implement the overall operation described herein.

The modem 40 and the transceiver 42 are coupled by interface device 44 which includes, as shown in FIG. 2, a 2-to-4 wire converter 46, control signal converter 48, and status signal converter 50. In the preferred embodiment an inexpensive microcontroller is used to perform some of the functions of the control signal converter 48 and status signal converter 50. In another embodiment, the microcontroller could easily be replaced by a small number of integrated circuits which would perform the same functions. It is assumed in this description of the preferred embodiment that DC power to operate the interface device is obtained from the cellular transceiver 42. Note that a battery could be added for embodiments where DC power is not obtainable from the radio transceiver.

The modem 40 is coupled to the interface 44 over a pair of wires 45, individually labeled as wires 45a and 45b. These wires may be coupled to the port of the modem used to connect the modem to the PSTN or to a separate port. In the preferred embodiment, the pair of wires used to communicate between the interface 44 and modem 40 is coupled to the pair of wires typically used by the modem to communicate with the PSTN.

In operation, the 2-to-4 wire converter performs the translation between the modem 40, which is expecting both the transmitted and received data to be communicated on the same wire, and the radio transceiver, which in the illustrated embodiment uses different wires for transmitted audio, received audio, data control signals to the phone and status signals from the phone. The 2-to-4 wire converter 46 outputs two signals, T-VOICE and TXA, and receives two signals, R-VOICE and STATUS-TONE. T-VOICE is the audio signal transmitted from the modem 40 to the radio transceiver 42 and R-VOICE is the audio signal received by the modem 40 from the radio transceiver 42.

Modern microprocessor-based modems have the capability of generating and detecting tones in the audio spectrum with great precision. These modems also have the capability of timing the duration of the tones generated or detected accurately. Modems generate and detect audio signals as part of the normal data transmission function. Therefore, using tones to communicate command and status information to a device attached to the normal PSTN connections of the modem adds no additional circuitry and no additional cost to the modem.

The present invention uses this tone transmission and reception capability of the modem to send command sequences and receive status sequences from the interface device 44. The interface device 44 converts the tone sequences sent by the modem to digital command signals acceptable by the cellular telephone transceiver to which it is attached. Likewise, the interface device 44 converts digital status signals from the cellular telephone transceiver to tone sequences which are detected by the modem (or other suitable signal which can be detected by the modem).

The control signal converter 48 receives tone bursts from the modem (as separated by the 2-to-4 wire converter 46) as signal TXA and translates the tone bursts to binary data for transmission to the radio transceiver 42. The status signal converter 50 receives status signals from the radio transceiver 42 in binary form and translates the status signals to a form which can be understood by the modem as signal STATUS-TONE. In the preferred embodiment, the status signals are translated to tone bursts which emulate a binary data signal. However, a typical modem may detect signals in a variety of forms, and it not necessary that the status signal converter necessarily translates the binary status data from the radio transceiver into tone bursts in order to communicate with the modem. STATUS-TONE is converted by the 2-to-4 wire converter and output to the modem 40.

Figure 3:
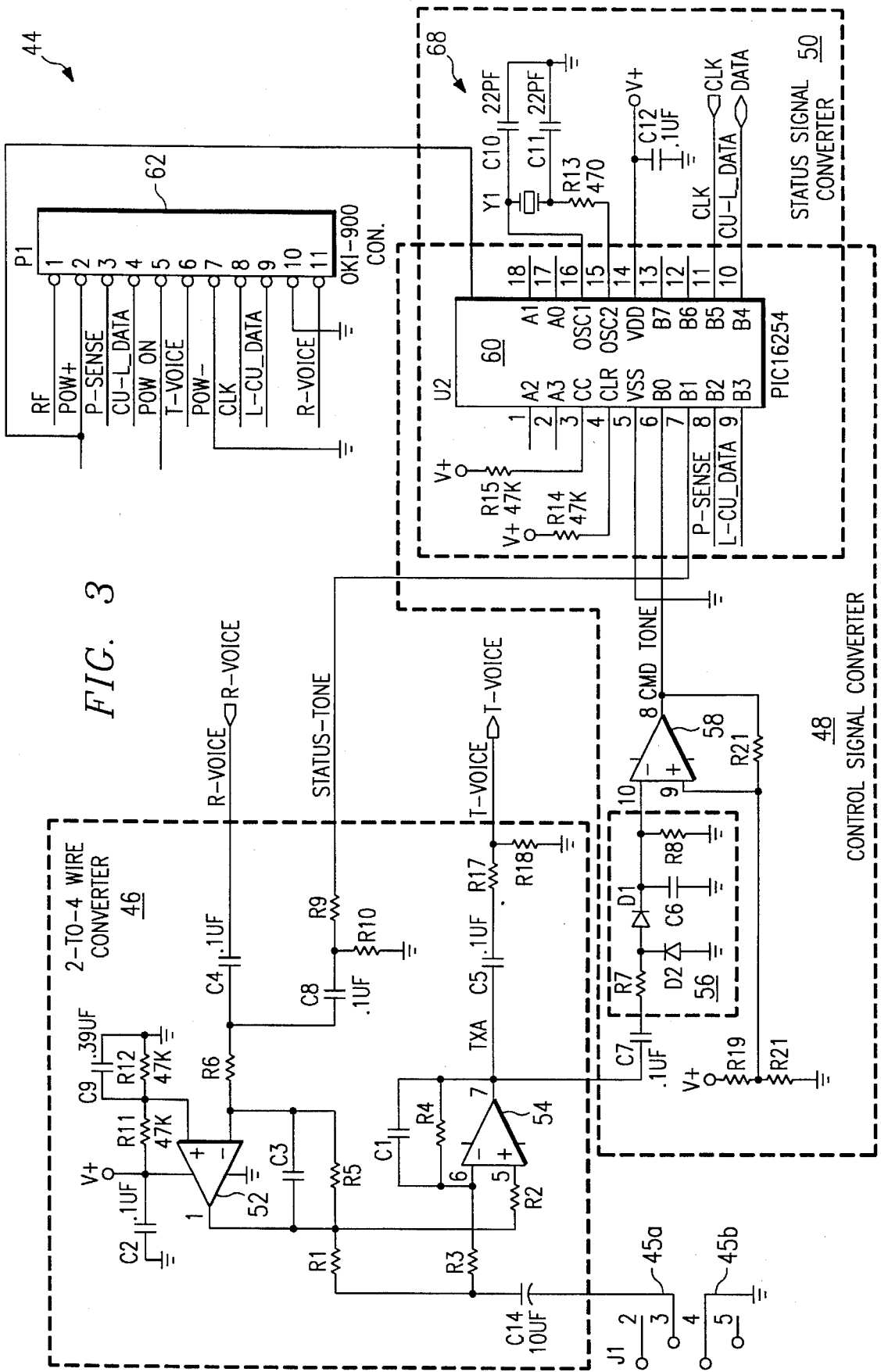
FIG. 3 is a schematic of the interface device of a Preferred Embodiment of the present invention.

FIG. 3 illustrates a schematic representation of the preferred implementation of the circuit of FIG. 2. As described above, the 2-to-4 wire converter receives signals from and transmits signals to the modem 40 over two wires of a standard J1 telephone modular connector physically conforming to Part 47 CFR Subpart 68 listed connector type R J11. Line 45b is coupled to ground. Operation amplifiers 52 and 54, along with the resistors and capacitors shown in FIG. 3, separates the signal transmitted from the modem 40 (TXA) from the combined transmit and receive audio signal on line 45a and also performs gain control between the modem 40 and the radio transceiver signals.

Resistors R17 and R18 form a voltage divider to reduce the voltage level of TXA to create signal T-VOICE. T-VOICE is input to the radio transceiver 42. TXA is also input to the control signal converter circuitry 48. Resistors R7 and R8, diodes D1 and D2 and capacitor C6 to form an integrator 56. The integrator 56 integrates the duration of each tone burst and the integrated voltage level is input to a comparator formed by operational amplifier 58 and its associated passive components R19–R21. The output of the operational amplifier 58 is a digital pulse (CMD-TONE) which is coupled to input B0 of microcontroller 60. The microcontroller 60 (shown in FIG. 3 as a MICROCHIP PIC16C54) has several internal shift registers which may store serial data received from the control signal converter 48 until a word is formed and then output the word to the radio transceiver 42 via the CU-L_DATA pin of plug 62 of the radio transceiver 42.

The comparator circuit 56 will reject transmitted tones from the modem 40 at levels lower than that of command tones. It is unlikely that any audio signals sent by the modem 40 representing computer data will appear to the program in the microcontroller 60 as the ESCAPE sequence even if the transmitted audio is above the threshold of the comparator. This allows the program in the microcontroller 60 to look for the ESCAPE command word from the modem 40 while it is in the ACTIVE state with the modem 40 transmitting audio signals representing computer data.

Similarly, the radio transceiver 42 sends binary status signal via the L-CU_DATA pin of microcontroller 60 for transmittal to the modem 40. A low state appearing at the L-CU_DATA pin of plug 62 coincident with the rising edge of the CLK pin of plug 62 is used to start the program in the microcontroller 60 shifting additional data bits on the L-CU_DATA pin into an internal holding register until an asynchronous data word has been accumulated. When an asynchronous data word has been accumulated, the program in the microcontroller 60 in conjunction with oscillating circuitry 68 utilizes a software audio oscillator to send a representation of the asynchronous data word in the form of tone bursts on the signal STATUS-TONE, which is routed to an input of operational amplifier 52. The resulting audio signal appears on the pair of wires in J1 and is detected by the modem 40. This action allows the modem 40 to decode status data as asynchronous data words from the radio transceiver 42 under control of the modem's internal processor or externally controlled by the attached computer.

Communication of control words from the modem 40 to the radio transceiver 42 or status words from the radio transceiver 42 to the modem 40 are enabled only when data communication is not in the ACTIVE state. The ACTIVE state is entered upon the microcontroller 60 receiving a SEND signal from the modem 40 and continues until an ESCAPE signal is received from the modem 40. When in the ACTIVE state, the microcontroller 60 will continue to input data bits from the modem 40 and store the bits in its internal shift registers, and will check the accumulated words to see if the word is an ESCAPE command. If so, the microcontroller 60 exits the ACTIVE state. The microcontroller 60 does not send status signals to the modem 40 while in the ACTIVE state, because such signals would interfere with the audio signal representing data.

Figure 4:
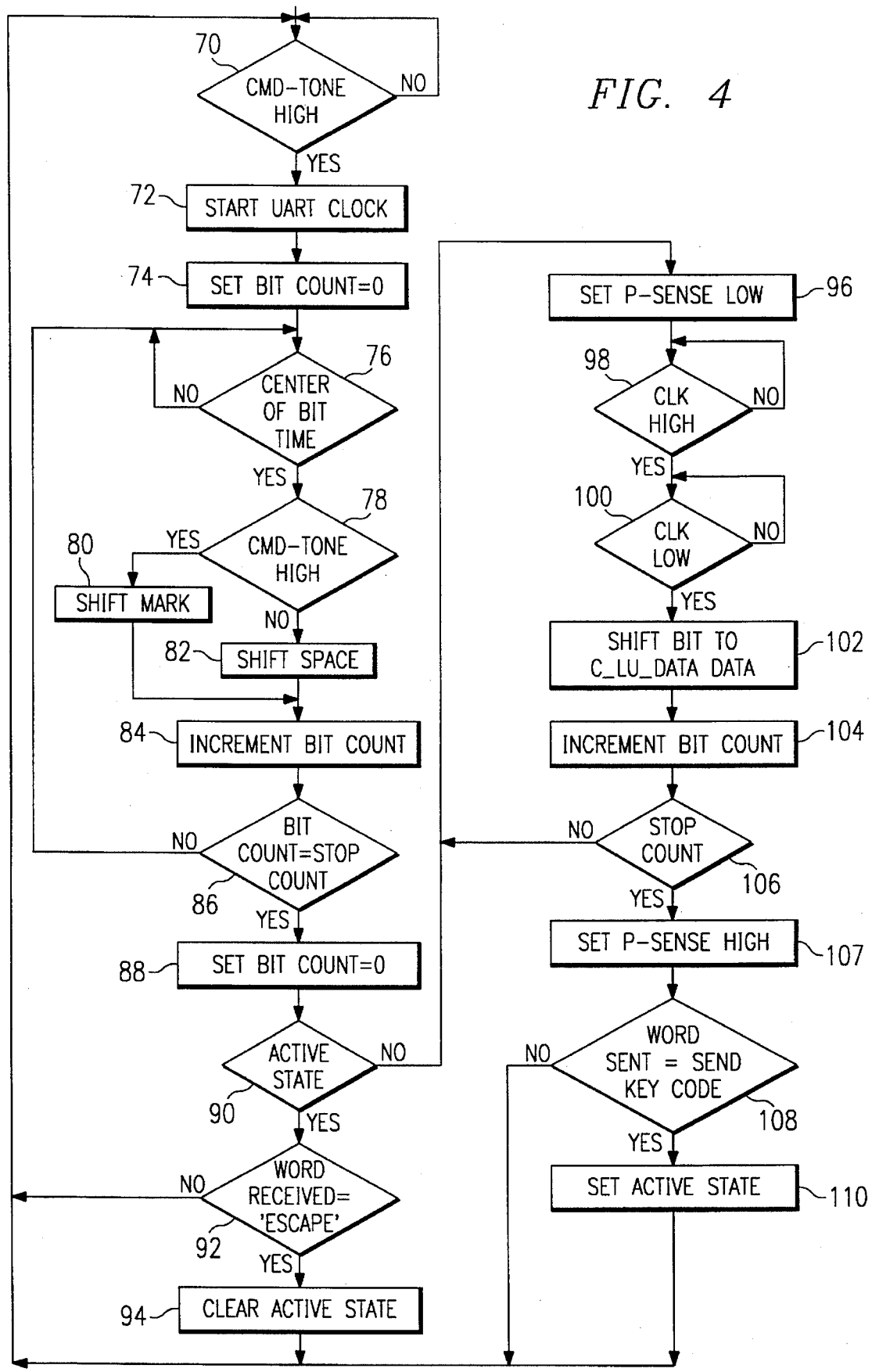
FIG. 4 is a flow chart of a typical control program executed by the modem to control the dialing of a connection in the present invention.

FIG. 4 is a flow chart describing operation of the microcontroller 60 with regard to processing control signals from the modem 40. In block 70, the microcontroller 60 detects the first tone burst from the modem 40 as a high level on the CMD-TONE output from the operational amplifier 58. In block 72, an internal clock of the microcontroller 60 is started. This clock is used to determine the center of bit times for the tone bursts. In block 74, a register holding the bit count of bits received from the modem 40 is set to zero. In decision block 76, a loop determines the point at which the center of bit time is reached. At the center of bit time, if the command tone from the modem 40 is a logical high in block 78, then a "mark" (in this example, it is assumed that a "mark" is a logical "1" and a "space" is a logical "0") is shifted into the internal shift register which stores the control words from the modem 40 in block 80. If the command tone is not a logical high in block 78, then a space is shifted into the shift register in block 82. The bit count is then incremented in block 84.

Decision block 86 creates a loop with blocks 76-84 which continues to shift data into the shift register until a word is formed. The number of bits per command word will depend upon the particular implementation of the radio transceiver 42. After a word is formed, the bit count is reset to zero in block 88.

In decision block 80, the microcontroller 60 checks to see if it is in the ACTIVE state, i.e., whether data is currently being transmitted between the radio transceiver 42 and the modem 40. If so, the word in the shift register is inspected to determine whether an ESCAPE sequence has been received from the modem 40 in block 92. If so, the active state is cleared in block 94 and control passes to block 70 where the microcontroller 60 waits for the next control signal from the modem 40. If the microcontroller 60 is in the ACTIVE state and the word in the shift register is not an ESCAPE sequence in block 92, then the word is ignored and control passes to block 70 where the microcontroller 60 waits for the next control signal from the modem 40.

If, in block 90, the microcontroller 60 is not in the ACTIVE state, then the microcontroller 60 drives the P-SENSE signal of the radio transceiver 42 low in block 96 to seize control of the radio transceiver 42. In decision blocks 98 and 100, the microcontroller 60 synchronizes with the radio transceiver's CLK signal by waiting for a high CLK transition followed by a low CLK transition before shifting the first bit of the word in the shift register on CU-L_DATA to the radio transceiver 42 in block 102. In block 104, the bit count is incremented. Decision block 106 forms a loop with block 96–104 which shifts bits out of the shift register until the entire word has been transmitted to the radio transceiver 42 via CU-L_DATA. Once the stop count is reached in decision block 106, the microcontroller 60 sets P-SENSE high in block 107 and determines whether the word sent to the radio transceiver 42 was a SEND sequence in decision block 108. If so, a flag is set in block 110 indicating that the ACTIVE state is present. Control then passes to block 70 to monitor the CMD-TONE signal for additional control words.

Communication of the control signals from the modem 40 to the interface 44 may take many forms. For example, the modem may use continuous wave (CW) keying or frequency shift keying (FSK) of audio-frequency alternating current signals representing binary ones and zeros. Alternatively, individual commands or digits could be represented by discrete tone frequencies or dual-tone multi-frequency (DTMF) signals.

Similarly, the microcontroller 60 could convert status signals to any form discernible by the modem over the lines 45a–b, such as by using CW keying or FSK keying of audio frequency alternating current signals representing binary ones and zeros or by representing individual status words by discrete tone frequencies or dual-tone multi-frequency signals.

Some other types of modems have 3- or 4-wire interfaces, with the transmitted analog signal separate from the received analog signal. Examples of such a modems are Personal Computer Memory Card Association (PCMCIA) form-factor modems designed for use with multiple, interchangeable, line interfaces. These are often intended for use in different countries with varying network interface requirements. In cases where the modem provides an interface which separates the received (R-VOICE) and transmitted (T-VOICE) analog signals, the 2-to-4 wire converter 46 is not needed in the interface 44. The TXA signal can be derived directly from the T-VOICE signal in the control signal converter 48 and the STATUS-TONE signal can be combined with the R-VOICE signal in the status signal converter 50.

The present invention provides significant advantages over the prior art. First, the invention may be used with any microprocessor-based modem by providing a program to control the operation of the modem when it is connected to a radio transceiver, either as firmware or by downloading the program from the computer to the modem. Second, all signaling may be accomplished over a single pair of connections normally used by the modem to connect to the Public Switched Telephone Network (or the 3- or 4- wire interface described above), thereby reducing the circuitry requirements of the interface. Third, since no additional circuitry is required in the modem, no additional size, weight, or cost is incurred by addition of the capability to control and communicate via the cellular telephone transceiver. This is particularly important in the portable computing market. Fourth, the interface device in the present invention is also optimized by the use of the described signaling method. The modem does not require Direct Current, Dial Tone, or High-Voltage Ringing lines. Since the interface device does not have to provide these signals to the modem, it can be much smaller and lower cost than Telco Simulators.

The tone signaling sequences that the modem provides and interprets to control the cellular telephone transceiver are sequences compatible with the particular transceiver attached. This is accomplished by the modem executing radio transceiver-specific programs which are either permanently stored in the modem or loaded from the computer to which it is attached. Since the interface device only has to integrate the tone sequences from the modem and convert them to a DC level compatible with the transceiver and to produce tones by keying an oscillation circuit with the status signal from the transceiver, the complexity of the interface device is greatly reduced.

Although the Detailed Description of the invention has been directed to certain exemplary embodiments, various modifications of these embodiments, as well as alternative embodiments, will be suggested to those skilled in the art. For example, the signals for controlling the radio transceiver will differ depending upon the particular implementation of the radio transceiver.

The invention encompasses any modifications or alternative embodiments that fall within the scope of the Claims.

What is claimed is:

1. An interface between a modem capable of sending and detecting audio frequency tone bursts and a radio transceiver for communication of computer data and control of said radio transceiver, comprising:

circuitry for transferring the computer data between said modem and said radio transceiver, said computer data being in the form of modulated audio signals produced by said modem and by a remote modem;

circuitry, coupled to said transferring circuitry, for converting audio-frequency tone bursts sent by said modem into corresponding sequences of binary high and low logic states for controlling the radio transceiver; and circuitry, coupled to said transferring circuitry, for converting binary high and low logic states representing status information sent by the radio transceiver into corresponding audio frequency tone bursts which are detectable by the modem.

2. The interface of claim 1 wherein said circuitry for converting said high and low logic states comprises:

circuitry for integrating the audio-frequency tone bursts; and circuitry, coupled to said integrating circuitry, for comparing the integrated audio-frequency tone bursts to a signal of predetermined value to determine high and low logic levels represented by integrated audio-frequency signal.

3. The interface of claim 1 wherein said circuitry for transferring computer data comprises circuitry for transferring computer data to and from said modem over a single pair of wires.

4. The interface of claim 1 wherein said circuitry for transferring computer data comprises circuitry for transferring computer data to and from said modem using separate lines for data transferred from the radio transceiver to the modem and for data transferred from the modem to the radio transceiver.

5. The interface of claim 1 and further comprising control circuitry for assembling said sequences of binary high and low logic states from the converting circuitry/into a binary control word.

6. The interface of claim 5 wherein said control circuitry detects the presence of predetermined values of said binary control word and sets state information responsive thereto.

7. The interface of claim 6 wherein said control circuitry further selectively transfers the binary control word to the radio transceiver responsive to said state information.

8. The interface of claim wherein said control circuitry selectively transfers the status information from the radio transceiver to the modem responsive to said state information.

9. The interface of claim 1 wherein said circuitry for converting audio-frequency tone bursts comprises circuitry for converting continuous wave keying of audio-frequency alternating current signals to binary high and low logic states.

10. The interface of claim 1 wherein said circuitry for converting audio-frequency tone bursts comprises circuitry for converting frequency-shift-keying of audio-frequency alternating current signals to binary high and low logic states.

11. The interface of claim 1 wherein said circuitry for converting audio-frequency tone bursts comprises circuitry for converting discrete tone frequencies representing individual control words into binary high and low logic states.

12. The interface of claim 1 wherein said circuitry for converting audio-frequency tone bursts comprises circuitry for converting dual tone multi-frequency signals representing individual control words into binary high and low logic states.

13. The interface of claim 1 wherein said circuitry for converting binary high and low logic states comprises circuitry for converting binary high and low logic states to continuous wave keying of audio-frequency alternating current signals.

14. The interface of claim 1 wherein said circuitry for converting binary high and low logic states comprises circuitry for converting binary high and low logic states to frequency-shift-keying of audio-frequency alternating current signals.

15. The interface of claim 1 wherein said circuitry for converting binary high and low logic states comprises circuitry for converting binary high and low logic states to discrete tone frequencies representing individual status words.

16. The interface of claim 1 wherein said circuitry for converting binary high and low logic states comprises circuitry for converting binary high and low logic states to dual tone multi-frequency signals representing individual status words.

17. A system for communication of data by a computer via a radio transceiver, comprising:

a microprocessor-based modem which is capable of sending and detecting discrete audio frequency tone bursts representing control and status information as well as modulating and demodulating computer data;

an interface coupled to said modem and said radio transceiver to communicate audio-frequency signals representing both computer data and control signals, said interface comprising:

circuitry for converting audio-frequency tone bursts sent by said modem into corresponding sequences of binary high and low logic states for controlling the radio transceiver; and circuitry for converting sequences of binary high and low logic states representing status information sent by the radio transceiver into corresponding audio frequency tone bursts which are detectable by the modem.

18. The system of claim 17 wherein said interface further comprises:

circuitry for integrating the audio-frequency tone bursts; and circuitry, coupled to said integrating circuitry, for separating computer data signals from control signals and outputting said control signals to said radio transceiver.

19. The system of claim 18 wherein said interface further comprises circuitry for combining said audio-frequency status signals with said computer data signals.

20. The system of claim 17 wherein said interface communicates with said modem using separate lines for signals sent to the modem and signals received from the modem.

21. The system of claim 17 wherein said modem has a port including a pair of wires for connection to the Public Switched Telephone Network.

22. The system of claim 21 wherein said interface is coupled to said port for connection to the Public Switched Telephone Network.

23. The system of claim 22 wherein said pair of wires for coupling the modem to the interface is coupled to said pair of wires for connection of the modem to the Public Switched Telephone System.

24. The system of claim 21 wherein said interface is coupled to a second port not used for connection to the Public Switched Telephone Network.

25. The system of claim 17 wherein said circuitry for converting audio frequency tone bursts comprises circuitry for converting continuous wave keying of audio frequency signals to binary high and low signal states.

26. The system of claim 17 wherein said circuitry for converting audio frequency tone bursts comprises circuitry for converting frequency-shift-keying of audio frequency signals to binary high and low signal states.

27. The system of claim 17 wherein said circuitry for converting audio frequency tone bursts comprises circuitry for converting discrete frequencies of audio frequency signals to binary high and low signal states.

28. The system of claim 17 wherein said circuitry for converting audio frequency tone bursts comprises circuitry for converting dual tone multi-frequency signals to binary high and low signal states.

29. A method of communicating data from a computer via a radio transceiver, comprising the steps of:

receiving audio-frequency computer data and control signals from a modem capable of sending and detecting a sequence of audio frequency tone bursts into an interface;

translating each audio-frequency tone bursts of a sequence representing a control signal into a corresponding binary high or low logic state and outputting the binary high or low logic states to the radio transceiver;

transmitting the audio-frequency computer data to the radio transceiver;

receiving high and low logic states representing status signals from the radio transceiver into the interface; and translating the high and low logic states to respective audio-frequency tone bursts and outputting the audio frequency tone bursts to the modem.

30. The method of claim 29 wherein said step of translating the audio-frequency tone bursts comprises the step of integrating a signal transmitted by the modem and comparing the integrated signal to a predetermined signal.

31. The method of claim 29 and further comprising the step of separating signals output by the modem from signals being sent to the modem.

32. The method of claim 29 and further comprising the step of accumulating the corresponding high and low logic states to form control words.

33. The method of claim 32 and further comprising the step of detecting predetermined control words and setting state information responsive to a detection of said predetermined control words.

34. An interface between a modem capable of sending and detecting audio frequency tone bursts and a radio transceiver for communication of computer data, comprising:

circuitry for transferring the computer data to and from said modem over a single bus for communicating audio frequency signals;

circuitry, coupled to said transferring circuitry, for converting audio-frequency tone bursts representing control information received from the modem on said single bus, each tone burst corresponding to a logical high or low state, into binary into logical high or low logic signals;

circuitry, coupled to said transferring circuitry, for converting binary status signals from the radio transceiver into corresponding audio-frequency tone bursts detectable by the modem; and circuitry for transferring said corresponding audio-frequency tone bursts to said modem over said single bus.

* * * * *

UNITED STATES PATENT AND TRADEMARK OFFICE
CERTIFICATE OF CORRECTION

PATENT NO. : 5,483,576
DATED : January 9, 1996
INVENTOR(S) : Leven E. Staples

It is certified that error appears in the above-indentified patent and that said Letters Patent is hereby corrected as shown below:

Col. 1, line 9, delete "Modum", insert --Modem--.

Col. 9, line 9, delete "circuitry/into", insert --circuitry into--.

Signed and Sealed this

Thirtieth Day of April, 1996

Attest:

BRUCE LEHMAN

Attesting Officer     Commissioner of Patents and Trademarks